United States Patent [19]
Melchior

[11] 3,949,555
[45] Apr. 13, 1976

[54] INTERNAL COMBUSTION ENGINES EQUIPPED WITH A TURBOCOMPRESSOR UNIT WITH HEATING UPSTREAM OF THE TURBINE AND METHODS OF STARTING UP THEIR TURBOCOMPRESSOR UNITS

[75] Inventor: Jean Melchior, Paris, France
[73] Assignee: Etat Francais, Paris, France
[22] Filed: Jan. 25, 1974
[21] Appl. No.: 436,728

[30] Foreign Application Priority Data
Feb. 22, 1973 France .............................. 73.06202

[52] U.S. Cl. .................................... 60/606; 60/619
[51] Int. Cl.² .................... F02B 33/44; F02B 33/32
[58] Field of Search .......... 60/39.14, 606, 614, 617, 60/619, 599; 123/119 CF

[56] References Cited
UNITED STATES PATENTS
3,096,615   7/1963   Zohn ...................................... 60/606
FOREIGN PATENTS OR APPLICATIONS
537,483   6/1941   United Kingdom Primary Examiner—Carlton R. Croyle
Assistant Examiner—L. J. Casaregola
Attorney, Agent, or Firm—Barnes, Kisselle, Raisch & Choate

[57] ABSTRACT

Diesel engines, equipped with a turbocompressor unit with a combustion chamber upstream of the turbine, comprising a by-pass duct enabling direct and permanent passage between the outlet of the compressor of the turbocompressor unit and said combustion chamber, comprise in addition, for the starting of the turbocompressor unit, a starting device comprising pressure difference generating means. These means are positioned in the by-pass duct in the midst of the air-flow between the compressor and the turbine and arranged to create a flow in the direction of the turbine of the turbocompressor unit. The pressure difference generating means may be constituted by a blower driven by an electric motor, or by an injector supplied with air under pressure and generating a flow by the effect of induction.

12 Claims, 4 Drawing Figures

INTERNAL COMBUSTION ENGINES EQUIPPED WITH A TURBOCOMPRESSOR UNIT WITH HEATING UPSTREAM OF THE TURBINE AND METHODS OF STARTING UP THEIR TURBOCOMPRESSOR UNITS

The invention relates to internal combustion engines, especially Diesel engines, equipped with a turbocompressor unit with a combustion chamber upstream of the turbine, and to methods of starting up their turbocompressor unit.

An engine of this type is hence supercharged by a turbocompressor unit comprising at least one compressor delivering compressed fresh air to supply the engine, and at least one turbine driving said compressor and actuated by the exhaust gases from said engine.

In such engines, it has been proposed in Applicant's prior U.S. applications Ser. Nos. 345,968 and 139,080 to provide a by-pass duct enabling direct and permanent passage between the output of the compressor and the combustion chamber which is hence supplied on one hand, with fuel and on the other hand, by the exhaust gases emerging from the engine and by fresh air taken up through the abovesaid by-pass duct.

When these engines have a low compression ratio (for example less than 12), it is necessary to resort to various artifices for starting them, but these artifices all have a certain number of drawbacks.

Thus it has been proposed to start up the turbocompressor unit, prior to the engine, by resorting to a starting motor, for example an electric motor, connected to the turbine-compressor assembly through a clutch. This solution has the drawback of requiring a clutch, that is to say a relatively expensive and complex mechanical member; moreover, it is necessary in the majority of cases to interpose a speed multiplying device between the engine (maximal rotary speed 3 to 4000 revolutions/minute) and the turbine-compressor assembly shaft (minimal starting rotary speed of the order of 18000 revolutions/minute). Finally, and if recourse is had to an existing turbocompressor unit, there is no shaft element accessible from the outside and adaptation of this unit to receive a motion transmitting device is extremely complex to realize, if not even impossible.

It has also been proposed to make the turbocompressor unit start up by resorting to an external air source which delivers air into the duct connecting the compressor to the turbine: thus this external source of air has been constituted by a reserve of air, or by a blower or compressor driven by an electric motor. However this solution has the drawback that the external source of air had to be able to supply the whole of the flow-rate of air necessary for the starting up of the turbocompressor unit which involves considerable power that is to say, a reserve of air of high capacity or a blower or compressor of high power.

It has also been proposed to make the turbine or the compressor of the turbocompressor unit include one or several pipes delivering compressed air jets oriented so as to drive the turbine to bring the turbocompressor unit to its minimal starting up speed. This solution implies the existence of a reserve of compressed gas corresponding to considerable stored energy since the efficiency of the one or more jets of gas on the turbine or on the compressor is very poor; moreover, the prolonged storage of energy in the form of compressed gas poses problems of duration, of recharging and it leads to the necessity of having available a source of gas under pressure (compressor or distributing system).

It is an object of the invention to provide a device for and a method of starting up which does not have the above-mentioned drawbacks.

It is another object of the invention to provide a device for and a method of starting up which require power much less than the power which it has been necessary to have available in resorting to solutions known hitherto.

It is a further object of the invention to provide a device for and a method of starting up which enables lubrication of the turbocompressor unit to be ensured just before its placing in rotation, which is not generally the case when recourse is had to solutions known hitherto.

It is yet another object of the invention to provide a device for and a method of starting up which ensure supply of the combustion chamber with fuel independently of the supply of fuel to this combustion chamber which is normally ensured by a fuel pump driven by the engine.

The engine according to the invention comprises, for starting up its turbocompressor unit, a starting up device comprising means for generating a pressure difference placed in the midst of the flow of air between the compressor and the turbine, and preferably in the by-pass duct, and arranged to create a flow in the direction of the turbine of the turbocompressor unit.

It will be understood then that these means for generating a difference in pressure need only supply a low difference of pressure since, as soon as the turbine is driven in rotation by the abovesaid flow, the compressor generates a flow-rate which traverses the abovesaid generator means; the delivery pressure of the compressor increases with its speed of rotation and becomes added to the pressure difference generated by the abovesaid generator means. Under these conditions, these generator means can be actuated by a source of power much weaker than that necessitated by the use of the above-mentioned conventional solutions.

In an advantageous embodiment of the invention, the means for generating a difference in pressure are constituted by a blower driven by an electric motor, this blower being able to be a centrifugal blower placed in a right angle elbow of the by-pass duct.

In another embodiment of the invention, the generating means for the difference of pressure are constituted by an ejector supplied with air under pressure and generating a flow by the effect of induction.

The method of starting up according to the invention consists, of generating, in the midst of the air flow between the compressor and the turbine, and preferably in the by-pass duct, a pressure difference suitable for creating a flow in the direction of the turbine of the turbocompressor unit, of igniting the combustion chamber as soon as this flow is established, and of maintaining this pressure difference until the turbocompressor reaches its autonomous speed and can operate with only the energy supplied by the combustion chamber.

The invention will in any case be well understood by means of the further description which follows as well as of the accompanying drawings, which description and drawings relate to preferred embodiments of the invention and are not of course intended to be of any limiting nature.

FIG. 1 of these drawings is a diagrammatic view illustrating a first embodiment of the invention.

Figure 1:
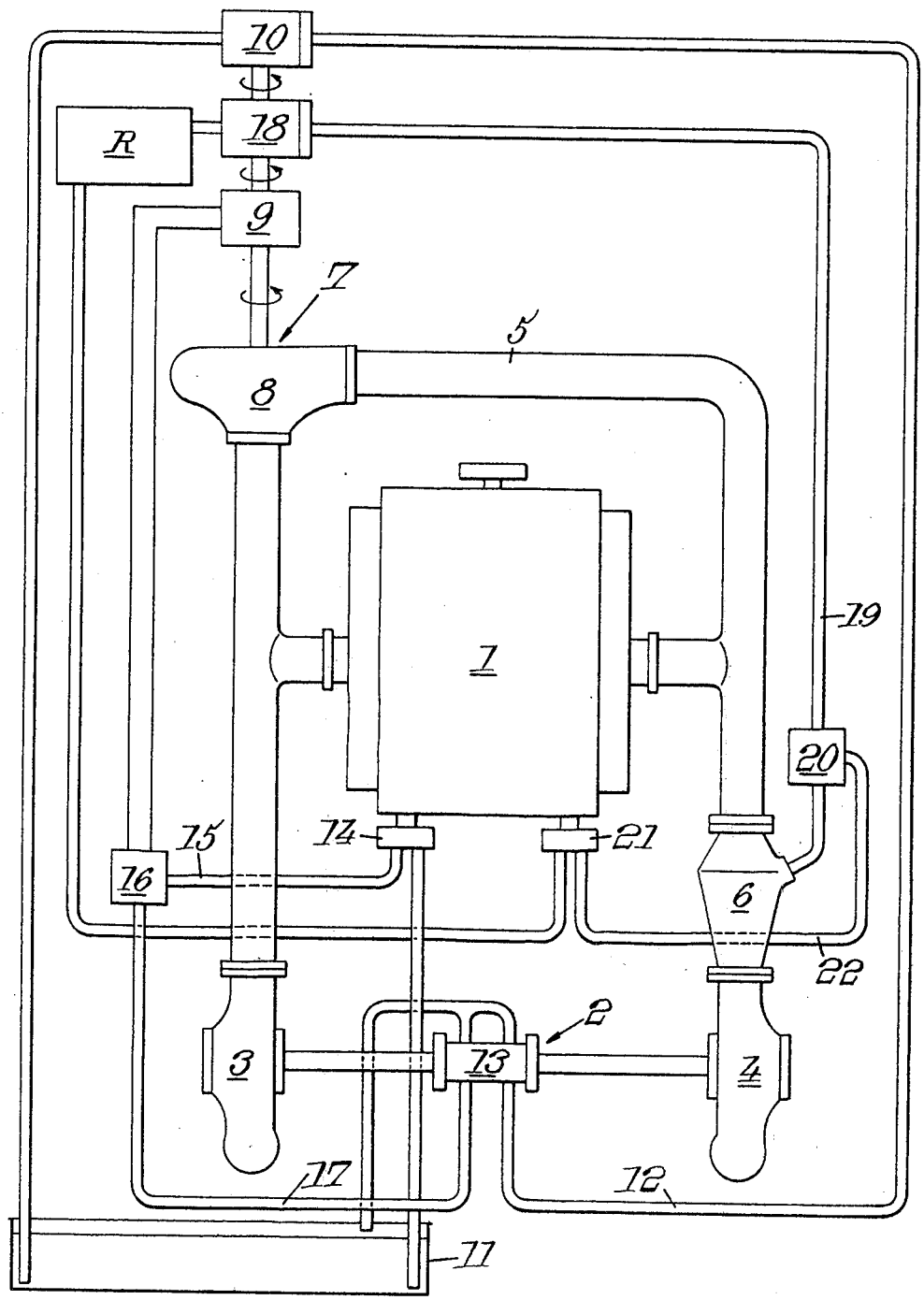
Figure 2:
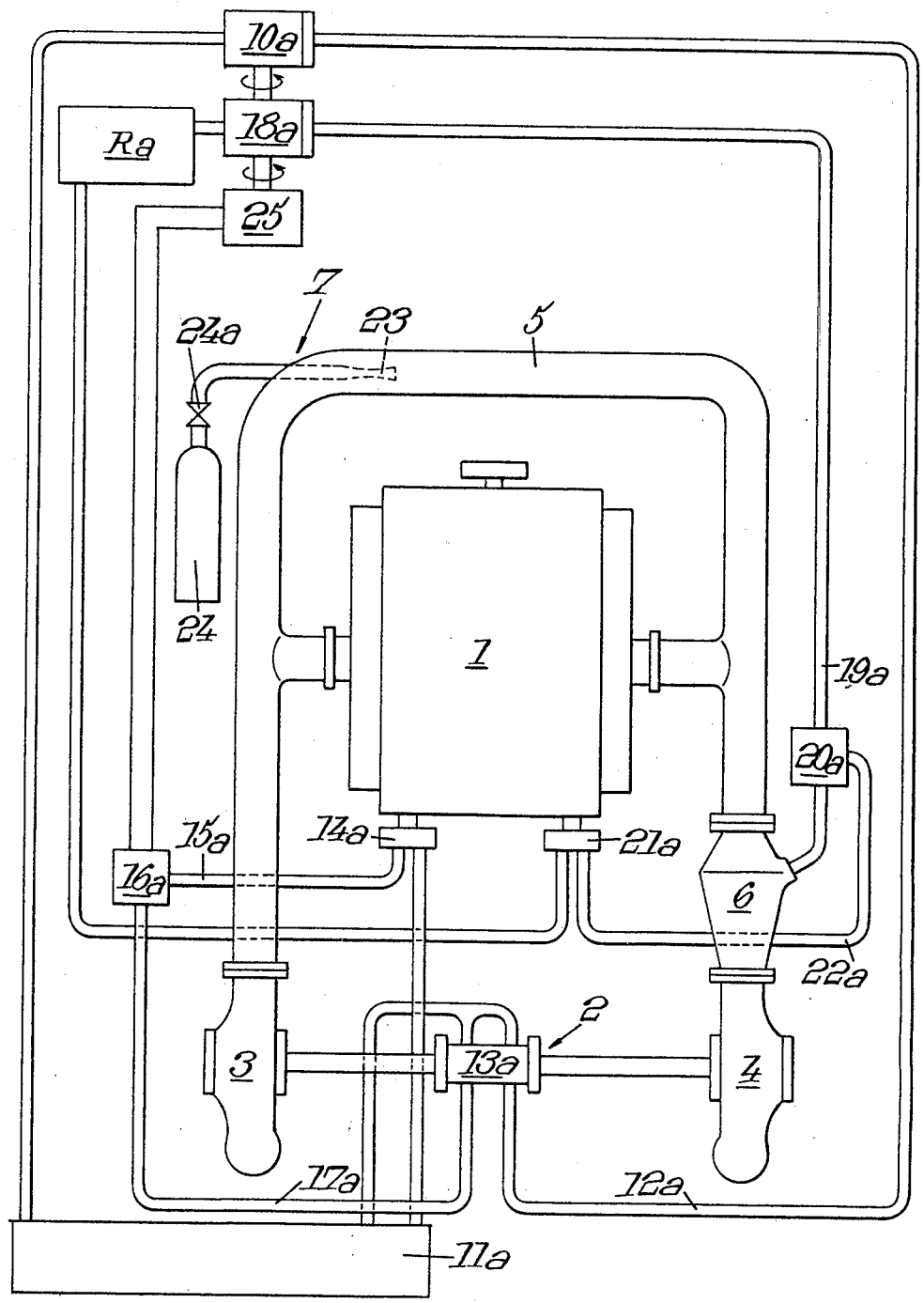
FIG. 2 is a diagrammatic view illustrating another embodiment of the invention.

The Diesel engine shown in FIGS. 1 and 2 is equipped with a turbocompressor unit 2 with a combustion chamber 6 upstream of the turbine.

This turbocompressor unit 2 comprises a compressor 3 delivering compressed fresh air to supply the engine, and a turbine 4 driving the compressor 3 and actuated by the exhaust gases from the engine 1.

Moreover, there is provided a by-pass duct 5 enabling direct and permanent passage between the outlet from the compressor 3 and the combustion chamber 6 placed upstream of the turbine 4.

This combustion chamber 6 is supplied, on one hand, with fuel, and on the other hand, at the same time by exhaust gases coming from the engine and by fresh air taken up in the by-pass duct 5.

As shown in FIGS. 1 and 2, there is provided a starting up device comprising means for generating a pressure difference, denoted generally by the reference numeral 7, positioned in the midst of the air flow in the by-pass duct 5 and arranged to create in this by-pass duct a flow in the direction of the turbine 4 of the turbocompressor unit 2.

Due to these means for generating a pressure difference 7, air is sucked through the compressor 3 and delivered through the turbine 4 which, as soon as it is rotated, drives the compressor 3 which delivers into the by-pass duct 5, this delivery passing through the abovesaid generator means; the delivery pressure from the compressor 3 increases with its speed of rotation and is added to the pressure difference generated by the abovesaid means. Through this fact, it suffices for the means for generating a pressure difference 7 to supply a low $\Delta P$ which is added to the always increasing pressure delivered by the compressor 3 in the course of the starting up process.

Under these conditions, the power necessary is minimal given that, as soon as the flow created by the means for generating a pressure difference 7 is established, the combustion chamber 6 is lit, which then supplies considerable energy to the turbocompressor.

In the embodiment shown in FIG. 1, the means for generating a pressure difference 7 are constituted by a centrifugal blower 8 driven by an electric motor 9, this centrifugal blower 8 being preferably placed in a right angle elbow of the by-pass duct 5.

This electric motor 9 also drives an oil pump 10 drawing lubricating oil from a casing 11 and delivering oil under pressure into a pipe 12 ending at the bearings, shown diagrammatically at 13, of the turbocompressor unit 2.

Due to this arrangement, the bearings 13 of the turbocompressor unit 2 are automatically lubricated before being placed in rotation, which placing in rotation would not be possible without this prior lubrication.

Once the Diesel engine 1 is started up, an oil pump 14 driven by said engine delivers through a passage 15 oil under pressure to a manometric device 16. As soon as the oil pressure delivered by the pump 14 reaches a given value, the manometric device 16 cuts off the electric supply to the motor 9 and permits the passage of oil under pressure in a pipe 17 ending at the bearings 13 of the turbocompressor unit 2.

The electric motor 9 of the blower 8 also drives a fuel pump 18 supplying the combustion chamber 6 through a pipe 19 and a fuel metering device 20, this fuel pump 18 drawing the fuel from a reservoir R.

When the electric motor 9 is stopped, the supply of fuel to the combustion chamber 6 is ensured through a fuel pump 21 driven by the Diesel engine 1 and which is connected to the fuel metering device by a pipe 22.

In the embodiment illustrated in FIG. 2, the means for generating a pressure difference 7 are constituted by an ejector 23 supplied with air under pressure and generating the flow by the effect of induction.

This ejector 23 can be supplied from a reservoir of compressed air 24 equipped with a pressure reducing valve 24a enabling the flow of compressed air to be controlled in the direction of the abovesaid ejector 23.

To obtain the same advantages as those indicated above as regards lubrication and supply of fuel, there is provided an auxiliary electric motor 25 driving an oil pump 10a and a fuel pump 18a, whose roles are respectively analogous to the role of the oil pump 10 and to that of the fuel pump 18 described with reference to the embodiment illustrated in FIG. 1. In addition the same members, denoted by the same reference numerals but supplemented by the index a, are also found in the embodiment illustrated in FIG. 2 and with the same functions as those indicated with regard to the embodiment of FIG. 1.

Figure 3:
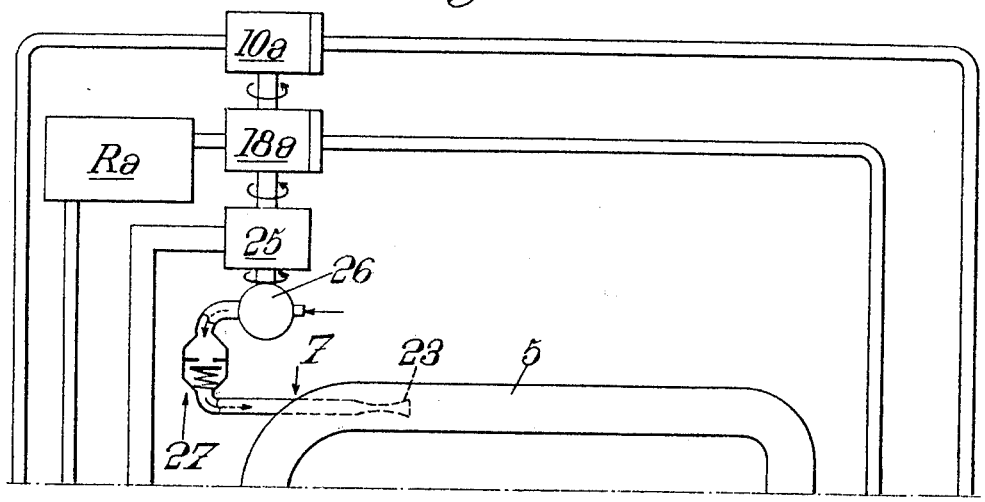
FIGS. 3 and 4 illustrate two modifications of the embodiment of FIG. 2.
Figure 4:
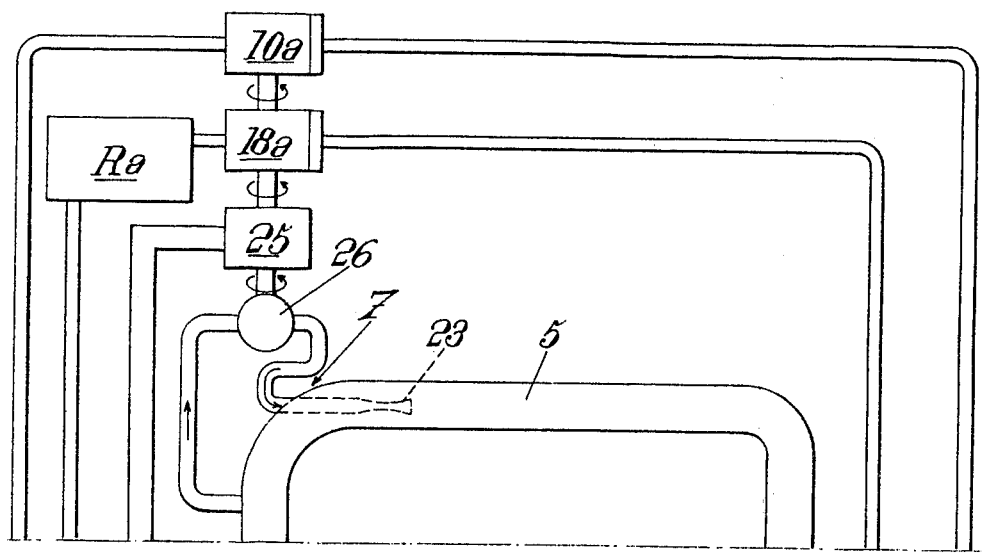

According to two modifications of the invention, illustrated in FIGS. 3 and 4 in which the same reference numerals denote the same members as in FIG. 2, the ejector 23 is supplied by an auxiliary compressor 26 advantageously constituted by a bladed compressor: this auxiliary compressor 26 is driven by the auxiliary electric motor 25 driving also the oil pump 10a and the fuel pump 18a.

In the modification illustrated in FIG. 3, the auxiliary compressor 26 draws in atmospheric air and delivers it into the ejector 23 through a check valve 27 which enables passage of the supercharging air to be avoided when the auxiliary compressor 26 is stopped.

In the modification illustrated in FIG. 4, the auxiliary compressor 26 draws from the air flow coming from the compressor 3, upstream of the ejector 23: this arrangement enables the placing in position of a check valve to be avoided and benefit to be derived from an aspirating pressure of the auxiliary compressor 26 which increases in the course of the process of starting up the turbocompressor unit.

Finally, and whatever the embodiment adopted, there is provided an internal combustion engine equipped with a turbocompressor unit whose starting up device applies means for generating a pressure difference which can be actuated by an extremely low source of power. In fact, it may be indicated that these means for generating a pressure difference have to supply only a $\Delta P$ of 0.015 bar until the flow is established and the combustion chamber can be lit.

Moreover, the means for generating a pressure difference are particularly simple to realize and can be actuated from an electric motor supplied by a battery, or a reserve of compressed air of low capacity.

Finally, any complication at the level of the turbocompressor unit is avoided (output shaft, clutch, speed multiplyer, etc.) and the turbocompressor unit can hence be an existing turbocompressor unit.

Moreover it is possible to effect one or several sequences of starting up in the case of extinction or of bad ignition of the combustion chamber: to do this, it suffices to bring into action again the means for generating a difference of pressure.

Finally, it should be indicated, that if the turbocompressor is accidentally stopped (for example by reason of mechanical troubles) the means for generating a difference of pressure can be brought into play which avoids reaspiration of the exhaust gases by the engine: in fact, the abovesaid means create a preferential flow and they oppose a reverse flow, playing for this reason the role of a "aerodynamic diode".

I claim:

1. In a supercharged internal combustion engine of the expansible chamber type having a turbocompressor unit including at least one compressor having an inlet open to draw in fresh air from the outside atmosphere and at least one turbine for driving said compressor, said engine having a combustion chamber system connected between said compressor and said turbine adapted to be supercharged by said turbocompressor unit, a bypass duct communicating with the outlet of said compressor and with the turbine inlet in parallel air flow relation with said engine combustion chamber system, an auxiliary combustion chamber having an inlet communicating with the compressor via said bypass duct and an outlet communicating with said turbine inlet, said compressor, turbine, bypass duct and auxiliary combustion chamber providing an open airway for said fresh air to flow therein from the compressor inlet to the turbine outlet via said bypass duct and said auxiliary combustion chamber, the combination therewith of a starting device for starting said turbocompressor comprising air moving means located within said open airway upstream of said turbine inlet and operable to develop a motive pressure difference for causing a flow of air in said airway, said flow comprising at least in part a flow of said fresh air from the outside atmosphere into said compressor inlet and through said open airway to said turbine outlet while said compressor, turbine and engine are initially stationary, said flow of air being sufficient to enable operation of said auxiliary combustion chamber to be initiated, and thereafter said air moving means also being operable to maintain said pressure difference once said compressor begins being rotated by said turbine such that said air moving means contributes to an increased circulation of said fresh air from said compressor to said turbine via said airway resulting from the conjoint operation of said air moving means, said auxiliary combustion chamber and said turbine-driven compressor, said air moving means being positioned in said bypass duct, said air moving means comprising an ejector disposed in said open airway and supplied with air under pressure and generating a flow by the effect of induction.

2. The combination set forth in claim 1 wherein said starting device includes a compressed air reserve supplying said ejector.

3. The combination set forth in claim 1 wherein said starting device includes an auxiliary electric motor driving an auxiliary compressor supplying said ejector.

4. The combination set forth in claim 1 and further including an oil pump driven by an auxiliary electric motor and operable to provide lubrication of the bearings of said turbocompressor unit until said internal combustion engine has started up.

5. The combination set forth in claim 4 and further including a fuel pump driven by said auxiliary electric motor and operable to supply fuel to said auxiliary combustion chamber until said internal combustion engine has started up.

6. The combination set forth in claim 3 and further including an oil pump driven by said auxiliary electric motor and operable to provide lubrication of the bearings of said turbocompressor unit until said internal combustion engine has started up.

7. The combination set forth in claim 3 and further including a fuel pump driven by said auxiliary electric motor and operable to supply fuel to said auxiliary combustion chamber until said internal combustion engine has started up.

8. The combination set forth in claim 3 wherein said auxiliary compressor sucks in atmospheric air and delivers it into said ejector through a non-return valve.

9. The combination set forth in claim 3 wherein said auxiliary compressor sucks in its air from the air flow emerging from said compressor of said turbocompressor unit and upstream of said ejector.

10. The combination set forth in claim 3 wherein said auxiliary compressor is a bladed compressor.

11. The combination set forth in claim 1 wherein air moving means is sized such that said motive pressure difference developed thereby is relatively low and less than that required to bring said turbocompressor unit up to self-sustaining operation.

12. A method for starting up a turbocompressor unit of an internal combustion engine wherein said turbocompressor unit has a fuel-fed auxiliary combustion chamber upstream of the turbine and said engine has a bypass duct between the outlet of said compressor and said auxiliary combustion chamber enabling direct and permanent passage of the airflow output of the compressor in bypass relation to the engine, said method comprising the steps of:

a. providing an ejector in said bypass duct oriented to direct a flow of air downstream therein, b. generating a pressure difference adapted to create an air flow between said compressor and said turbine through said auxiliary combustion chamber in the direction of said turbine while said compressor, turbine and engine are initially stationary by supplying air under pressure to said ejector to cause air to issue therefrom to thereby induce said air flow c. igniting in said combustion chamber the fuel supplied thereto as soon as said air flow has been established, and d. then maintaining said pressure difference until said turbocompressor has reached self-maintaining speed and can operate with only the energy provided by said auxiliary combustion chamber.

* * * * *